United States Patent [19]

Gehrmann

[11] Patent Number: 5,444,496
[45] Date of Patent: Aug. 22, 1995

[54] METHOD OF SEPARATING A FOREGROUND PICTURE SIGNAL FROM A MIXED PICTURE SIGNAL, AND ARRANGEMENT FOR PREFORMING SAID METHOD

[75] Inventor: Rainer Gehrmann, Alsbach-Hähnlein, Germany

[73] Assignee: U.S. Philips Corporation, New York, N.Y.

[21] Appl. No.: 190,429

[22] Filed: Feb. 2, 1994

[30] Foreign Application Priority Data

Feb. 5, 1993 [DE] Germany .................. 43 03 348.2

[51] Int. Cl.⁶ ............................................. H04N 9/75
[52] U.S. Cl. .................................. 348/587; 348/592
[58] Field of Search .............. 348/578, 587, 590, 591, 348/592, 599, 597, 595; 358/22 CK; H04N 9/74, 9/75, 5/272, 5/275

[56] References Cited

U.S. PATENT DOCUMENTS 5,301,016 4/1994 Gehrmann ........................ 348/578

FOREIGN PATENT DOCUMENTS 2044036 10/1980 United Kingdom .
2262860 6/1993 United Kingdom .

Primary Examiner—James J. Groody
Assistant Examiner—Sherrie Hsia
Attorney, Agent, or Firm—Edward W. Goodman

[57] ABSTRACT

In a method of separating a foreground picture signal FG from a mixed picture signal MG which has a key color KC as well as transition colors to this key color in key regions, the foreground picture signal is removed from the key color and the transition colors in accordance with the equation $$FG = MG - k*KC.$$

Herein, k is a control signal which has a value of about 1 in the region of the key color KC and a value of about 0 at the transition boundaries. The transition boundaries in the $C_b/C_r$ color plane are constituted by two straight lines through the origin of the $C_b/C_r$ color plane which, relative to a vector $D_{KC}$ of the key color extending from the origin of the $C_b/C_r$ color plane to the color location KC of the key color, are arranged at angles $\omega_o$ and $\omega_u$, respectively. The straight lines through the origin of the $C_b/C_r$ color plane are arranged automatically and optimally in that those pixels are filtered from the mixed picture signal whose color locations in the $C_b/C_r$ color plane are spaced apart by a distance which is smaller than a predetermined distance from color locations of one or more pixels adjoining one another with respect to time or location, in that accumulations of the filtered pixels are determined and in that the angles $\omega_o$ and $\omega_u$ of the two straight lines through the origin of the $C_b/C_r$ color plane are chosen to be such that the accumulations closest to the key color KC in the $C_b/C_r$ color plane are not located in the region between the key color KC and the transition boundaries constituted by the straight lines through the origin of the $C_b/C_r$ color plane.

5 Claims, 2 Drawing Sheets

METHOD OF SEPARATING A FOREGROUND PICTURE SIGNAL FROM A MIXED PICTURE SIGNAL, AND ARRANGEMENT FOR PREFORMING SAID METHOD

BACKGROUND OF THE INVENTION

1. Field of the Invention

The invention relates to a method of separating a foreground picture signal FG from a mixed picture signal MG which has a key color KC as well as transition colors to this key color in key regions, the foreground picture signal being removed from the key color and the transition colors in accordance with the equation $$FG = MG - k*KC$$

in which k is a control signal which has a value of about 1 in the region of the key color KC and a value of about 0 at the transition boundaries, the transition boundaries in the $C_b/C_r$ color plane being constituted by two straight lines through the origin of the $C_b/C_r$ color plane which, relative to a vector $D_{KC}$ of the key color extending from the origin of the $C_b/C_r$ color plane to the color location KC of the key color, are arranged at angles $\omega_o$ and $\omega_u$, respectively.

2. Description of the Related Art

Such a method is known from GB-A-2 044 036. The method can be used for removing the key color occurring in the key regions of the mixed picture signal, as well as transition colors occurring between the foreground picture signal and the key color, and possibly replacing these regions by a background picture signal. A particular problem in this respect is to recognize the transition colors as such and to suppress them accordingly. The limit up to which parts of the key color or transition colors are removed from the mixed picture signal is constituted by transition boundaries which are formed by two straight lines through the origin of the $C_b/C_r$ color plane in the $C_b/C_r$ color plane. All the color locations between these straight lines through the origin of the $C_b/C^r$ color plane and the color location KC of the key color are considered as key colors or as transition colors. Exclusively in the region between the key color and the transition boundaries, a pan of the key color is removed from the mixed picture signal for generating the foreground picture signal. The transition boundaries are the straight lines through the origin of the $C_b/C_r$ color plane. Relative to the vector $D_{KC}$, these lines are arranged at angles $\omega_o$ and $\omega_u$ of the $C_b/C_r$ color plane. The vector $D_{KC}$ extends from the origin of the $C_b/C_r$ color plane to the color location KC of the key color. The angles $\omega_o$ and $\omega_u$ are the angles between the vector $D_{KC}$ and the two straight lines through the origin of the $C_b/C_r$ color plane.

SUMMARY OF THE INVENTION

It is an object of the invention to further improve this method in such a way that the transition boundaries are possibly adjusted in such a way that the foreground picture signal is influenced as little as possible and that possibly all parts of the key color as well as the transition colors are removed from the mixed picture signal so that they no longer occur in the foreground picture signal.

According to the invention, this object is achieved in that those pixels are filtered from the mixed picture signal whose color locations in the $C_b/C_r$ color plane are spaced apart by a distance which is smaller than a predetermined distance from color locations of one or more pixels adjoining one another with respect to time or location and whose color locations in the $C_bC_r$ color plane are arranged outside a predetermined angular range around the vector $D_{KC}$, in that accumulations of the filtered pixels are determined and in that the angles $\omega_o$ and $\omega_u$ of the two straight lines through the origin of the $C_b/C_r$ color plane are chosen to be such that the accumulations closest to the key color KC in the $C_b/C_r$ color plane are not located in the region between the key color KC and the transition boundaries constituted by the straight lines through the origin of the $C_b/C_r$ color plane.

In order to fix the transition boundaries, i.e. the straight lines through the origin of the $C_b/C_r$ color plane constituting these boundaries at maximally favourable angles $\omega_o$ and $\omega_u$ relative to the vector $D_{KC}$ in the $C_b/C_r$ color plane, the color locations of the pixels of the mixed picture signal are fixed in the $C_b/C_r$ color plane. Initially, those pixels whose color locations in the $C_b/C_r$ color plane are spaced apart by a distance which is smaller than a predetermined distance from the color locations of adjoining pixels and whose color location in the $C_b/C_r$ color plane is outside an angular range $-\omega_{KC}/+\omega_{KC}$ around the vector $D_{KC}$ of the key color are filtered from the pixels of the mixed picture signal. These color locations are most likely those pixels of the mixed picture signal which belong to the foreground and should be associated with the foreground picture signal to be separated, because particularly the transition colors represent a relatively large change of the part of the key color KC and thus most likely have a distinctively different color location in the $C_b/C_r$ color plane than the color locations of pixels adjoining one another with respect to time or location.

Accumulations of the color locations of the pixels of the mixed picture signals which have initially been filtered out and which most likely belong to the foreground, are determined in the $C_b/C_r$ color plane. These accumulations are color locations which occur in the mixed picture signal and do not belong to the key color but to the actual picture contents of the foreground which is to be filtered out as the foreground picture signal. The pixels whose color locations constitute these accumulations should thus be added to the foreground picture signal. Consequently, the two straight lines through the origin of the $C_b/C_r$ color plane in the $C_b/C_r$ color plane are arranged in such a way that, viewed from the key color KC, these accumulations, particularly those being closest to the key color KC, are located beyond the transition boundaries constituted by the straight lines through the origin of the $C_b/C_r$ color plane. The angles $\omega_o$ and $\omega_u$ of the two straight lines through the origin of the $C_b/C_r$ color plane are chosen in such a way that the accumulations are not located between the straight lines through the origin of the $C_b/C_r$ color plane and the key color KC.

In this way it is ensured, on the one hand that the foreground picture signal is influenced as little as possible by the separation of the key color the transition colors. On the other hand, the range of the mixed picture signal in which transition colors occur, is extended as far as those pixels which should belong to the foreground picture signal. The transition colors may then be correctly separated in these ranges. Separation of the foreground picture signal FG from the mixed picture signal MG is performed in accordance with the equation $$FG = MG - k^*KC$$

The control signal k determines how much KC share is withdrawn. K fluctuates between about 1 in the key color region and about 0 in the region of the straight lines through the origin of the $C_b/C_r$ color plane constituting the transition boundaries.

In accordance with an embodiment of the invention, the control signal k may advantageously be used to control a fading between the foreground picture signal and a background picture signal. The key regions which originally represent the key color KC as well as transition colors between the key color KC and the foreground in the mixed picture signal are replaced by a background picture signal. The control signal k, which was used for a soft and smooth separation of the foreground picture signal from the mixed picture signal, may also be used for fading between the foreground picture signal and the background picture signal.

In accordance with a further embodiment of the invention, the determination of the values of the distances between the color locations and one or more pixels adjoining one another with respect to time or location and the evaluation of these distance values are effected field by field. For each field the location of the transition boundaries is fixed individually in accordance with the procedure described above so that there is a rapid response to changes of the picture contents and thus also an optimal course of the transition boundaries.

For an arrangement for performing the method, with which it is easy to fix those pixels which most likely belong to the foreground picture signal, a further embodiment of the invention is characterized in that a control unit is provided which

- by means of a comparison circuit, determines the color location distances and compares them with distances between pixels adjoining one another with respect to time or location,
- stores those pixels in a memory, whose color locations are spaced apart by a distance which is smaller than a predetermined distance from color locations of one or more pixels adjoining one another with respect to time or location,
- determines the chroma angles in the $C_b/C_r$ color plane of the pixels stored in the memory and also stores these angles in a memory, determines accumulations from the stored chroma angles by means of a digital signal processor and, by way of comparison, selects those accumulations from the determined accumulations which are closest to the key color KC but are outside the predetermined angular range $-\omega_{KC}/+\omega_{KC}$ in the $C_b/C_r$ color space, and which
- selects the angles $\omega_o$ and $\omega_u$ of the straight lines through the origin of the $C_b/C_r$ color plane in the $C_b/C_r$ color space relative to the vector of the key color KC in such a way that the accumulations in the $C_b/C_r$ color space closest to the key color KC are no longer located in the region between the transition boundaries and the key color KC.

Also in this arrangement, the color locations can be filtered out and their accumulations can be fixed field by field.

These and other aspects of the invention will be apparent from and elucidated with reference to the embodiment described hereinafter.

DESCRIPTION OF THE PREFERRED EMBODIMENTS

Figure 1:
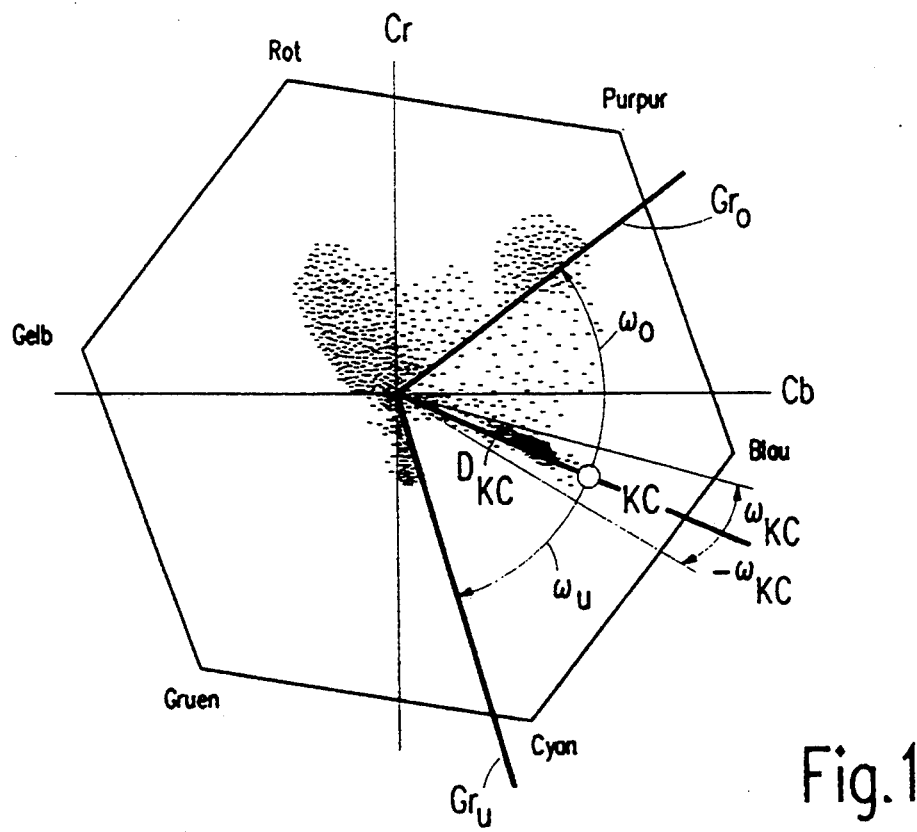
FIG. 1 shows diagrammatically the $C_b/C_r$ color plane with color locations of, for example a field of a mixed picture signal, and two straight lines through the origin of the $C_b/C_r$ color plane constituting the transition boundaries.

FIG. 1 shows diagrammatically the $C_b/C_r$ color plane in which $C_b$ and $C_r$ are color difference signals. The luminance values of pixels are not taken into account in this color plane.

In the $C_b/C_r$ color plane shown in FIG. 1, the color locations of pixels of a mixed picture signal are represented by way of black areas. These color locations may be, for example the color locations of the pixels of a field of this mixed picture signal.

FIG. 1 shows that the color locations of these pixels form accumulations in the $C_b/C_r$ color plane. These accumulations are produced because given pixel regions having similar colors are present in the mixed picture signal. FIG. 1 shows that one of these accumulations is produced by the key color KC. These accumulations of the pixels, whose color locations accumulate in the vicinity of the key color KC, are certainly associated with the key color KC and thus with that part of the mixed picture signal which is to be removed when the foreground picture signal is separated from the mixed picture signal. Consequently, pixels with color locations in a close angular range with respect to the key color KC should not be assigned to the foreground picture signal.

FIG. 1 shows further accumulations of the mixed picture signal which are most likely associated with the foreground picture signal and are thus to be separated from the mixed picture signal.

In FIG. 1 these accumulations occur, for example in the red, purple and green/cyan color regions.

The Figure shows the vector $D_{KC}$ which represents the color vector extending from the origin of the $C_b/C_r$ color plane to the color location KC of the key color. Angular ranges $+\omega_{KC}$ and $-\omega_{KC}$ are shown at both sides of the vector $D_{KC}$. Color locations in this close angular range around the vector $D_{KC}$ and around the key color KC are quasi-associated with the key color KC. Furthermore, two straight lines $Gr_o$ and $Gr_u$ through the origin of the $C_b/C_r$ color plane are shown which indicate the transition boundaries in the $C_b/C_r$ color plane, as far as which the key color or the transition colors, respectively, are to be filtered from the mixed picture signal. The upper boundary $Gr_o$ is arranged at an angle $\omega_o$ with respect to the vector $D_{KC}$. The lower boundary $Gr_u$ is arranged at an angle $\omega_u$ with respect to this vector $D_{KC}$. The lower boundary $Gr_u$ and the upper boundary $Gr_o$ are arranged in the $C_b/C_r$ color plane in such a way that the small number of accumulations of the color locations of the mixed picture signal occurring outside the angular range $-\omega_{KC}/+_{KC}$ are just beyond the two boundaries $Gr_u$ and $Gr_o$, as viewed from the key color KC. In other words, the boundaries $Gr_u$ and $Gr_o$ are chosen to be such that the accumulations which are closest to the angular range $-\omega_{KC}/+\omega_{KC}$ and which are outside this angular range are also located just beyond the boundaries $Gr_u$ and $Gr_o$.

FIG. 1 shows that these straight lines through the origin of the $C_b/C_r$ color plane, which constitute the transition boundaries, are arranged in such a way that the foreground-associated accumulations of the color locations of the pixels are arranged just outside the region between the angular range $-\omega_{KC}/+\omega_{KC}$ around the key color KC and the transition boundaries constituted by the straight lines through the origin of the $C_b/C_r$ color plane. These accumulations, which are to be associated with the foreground picture signal, are then no longer influenced by the removal of the key color and the transition colors from the mixed picture signal.

FIG. 1 also shows that individual color locations occur between the accumulations of the color locations in the vicinity of the key color KC, which are located in the angular range $-\omega_{KC}/+\omega_{KC}$ and are associated with the key color, and the other accumulations which are associated with the foreground, said individual color locations being transition colors between the key color KC and foreground colors to be added to the foreground picture signal.

The foreground picture signal FG is separated from the mixed picture signal MG in accordance with the equation $$FG = MG - k^*KC$$

In this equation, k is a control signal which has a value of about 1 in the key color region so that in this region all KC components are filtered for the purpose of separating the foreground signal. The control signal k should, however, reach a value of about 0 at the transition boundaries so that beyond the transition boundaries the mixed picture signal is no longer influenced because pixels whose color locations are in this region can be considered to belong to the foreground and should be contained unchanged in the foreground picture signal FG.

The control signal k can be formed in accordance with the equation $$k = D/D_{KC}$$

in which $D_{KC}$ is the vector extending from the origin of the $C_b/C_r$ color plane to the color location KC of the key color and in which D is that vectorial part of the distance between the color of a pixel to the next transition boundary which extends in the $C_b/C_r$ color plane in the same vectorial direction as the vector $D_{KC}$.

Based on the representation shown in FIG. 1, this mode of separating the foreground picture signal FG from the mixed picture signal MG means that, in accordance with the representation shown in FIG. 1, those color locations which are associated with the foreground and are thus not located in the space between the key color KC and the two transition boundaries $Gr_o$ and $Gr_u$, completely belong to the foreground picture signal FG. The color locations in the region of the key color KC are fully suppressed. In accordance with the above-mentioned equations, the transition colors in the region between the key color KC and the transition boundaries are only weakly suppressed in the region of the transition boundaries, but are suppressed to an increasingly stronger extent towards the key color KC. This results in a smooth transition in the suppression of the transition colors between the key color KC, where they are suppressed to the strongest extent, and the transition boundaries $Gr_o$ and $Gr_u$, where they are suppressed to the weakest extent. The color locations of the foreground, which are to belong to the foreground signal FG, are not influenced.

This mode of filtering may be performed, for example, field by field, in which a rapid adaptation to a changing picture content also yields changing color locations.

The operation of filtering the foreground picture signal FG from the mixed picture signal MG on the basis of the equation described above and the computation of the control signal k will be elucidated hereinafter with reference to FIG. 2.

Figure 2:
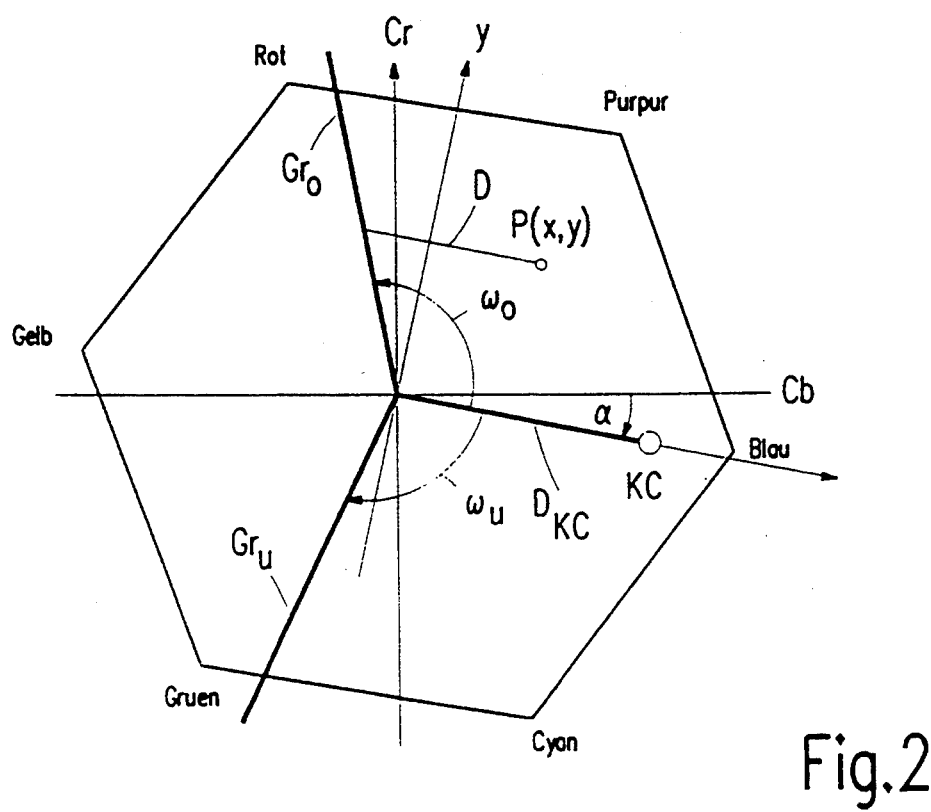
FIG. 2 shows the $C_b/C_r$ color plane of FIG. 1 with differently arranged straight lines through the origin of the $C_b/C_r$ color plane.

In FIG. 2, similarly as in FIG. 1, the color location KC of the key color is not situated on the $C_b$ axis of the $C_b/C_r$ color plane. The key color KC is rather situated on the x axis of a system of coordinates x/y. This situation of the key color KC makes it more difficult to compute the control signal k in so far as a coordinate transformation is required for computing the control signal k, by which transformation the vector D explained hereinbefore can be determined.

In FIG. 2, this vector D is shown for an exemplary point P with the coordinates x and y. The control signal k is obtained by dividing the vector D by the vector $D_{KC}$ of the key color.

In FIG. 2, the system of coordinates x/y is turned clockwise about an angle $\xi$ with respect to the system of coordinates in $C_b/C_r$ color plane. The following equations for the coordinate transformation are then obtained:

$$x = C_b^* \cos(\alpha) + C_r^* \sin(\alpha)$$

and $$y = C_r^* \cos(\alpha) - C_b^* \sin(\alpha).$$

The vector D to be found for a point P(xy) shown by way of example in FIG. 2 is obtained from the equation $$D = x + y^* \tan(\omega)$$

in which $\omega$ is either $\omega_o - 90°$ or $\omega_u - 90°$, dependent on the location of the point P. The control signal k can then be determined in accordance with the equation $$D/D_{KC}.$$

Thus the control signal assumes values of between 1 and 0 in a smooth transition. The value 1 of the control signal k is reached when the vector D has the same value as the vector $D_{KC}$. This is the case when an arbitrary point in the color space has the same distance to the transition boundaries as the key color KC. Upon separation of the foreground picture signal, this point is fully suppressed because it is most likely to be associated with the key color KC. A corresponding situation applies to all pixels with color locations on the straight lines extending from the origin of the $C_b/C_r$ color plane to the key color KC.

Pixels with color locations offside this straight line are also deprived from their KC component but residual color components located on the transition boundaries are maintained.

While approximating such a point at the transition boundaries $Gr_o$ and $Gr_u$, the value D will become increasingly smaller relative to the vector $D_{KC}$, so that also the control signal k assumes an increasingly smaller value which finally reaches the value of 0 at the boundaries $Gr_o$ and $Gr_u$. In this transition range the components of the key color KC in accordance with the equation $$FG = MG - k^*KC$$

are suppressed to an increasingly weaker extent so that finally color components KC at and beyond the boundaries $Gr_o$ and $Gr_u$ are no longer suppressed and the mixed picture signal in these ranges is taken over in an unchanged form in the foreground picture signal.

Figure 3:
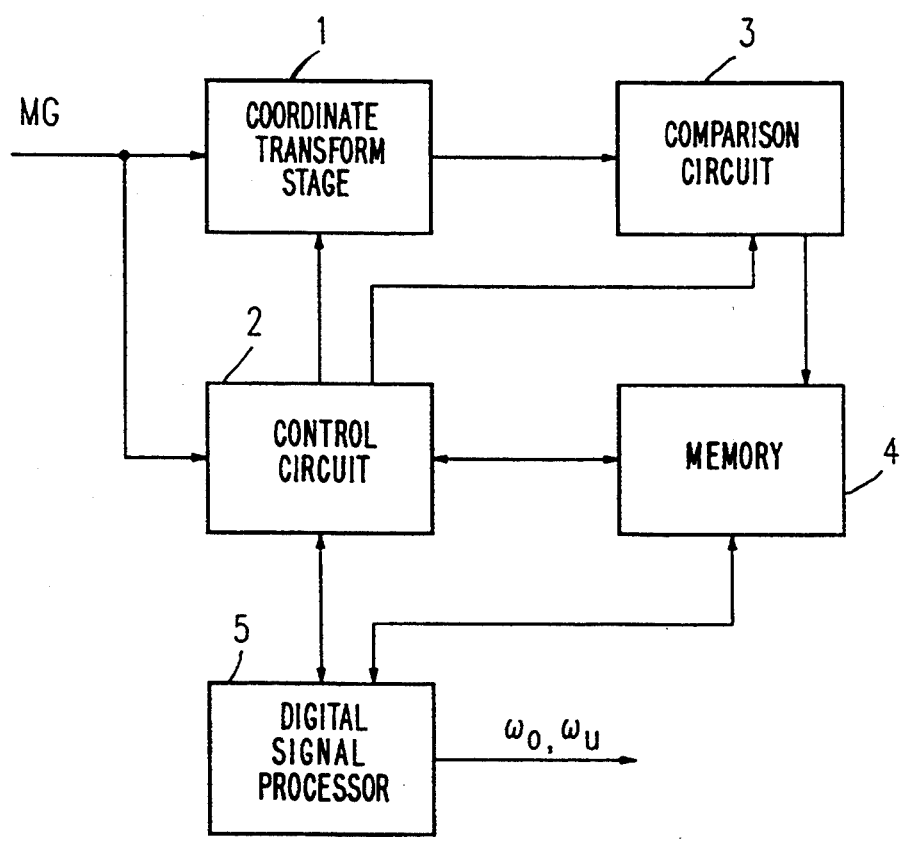
FIG. 3 shows diagrammatically an arrangement for determining the transition boundaries.

FIG. 3 is a block diagram of an arrangement for performing the method.

The input of the arrangement receives a mixed picture signal MG which is applied to a unit 1 for coordinate transformation. In this unit 1 a coordinate transformation is performed in the manner described above when the color location of the key color KC is not situated on the $C_b$ axis of the $C_b/C_r$ color plane.

The mixed picture signal is further applied to a control unit 2 which controls the determination of the angles $\omega_o$ and $\omega_u$ of the straight lines through the origin of the $C_b/C_r$ color plane constituting the transition boundaries.

After the coordinate transformation has been performed, the mixed picture signal transformed as regards its coordinates is applied to a comparison unit 3. This comparison unit compares the distances of the color locations of the pixels of the mixed picture signal with the color locations of pixels adjoining one another with respect to time or location. The control unit 2 filters out those pixels whose color locations are spaced apart from color locations of one or more pixels adjoining one another with respect to time or location over a distance which is smaller than a predetermined distance. These pixels thus filtered out are stored in a memory 4.

The chroma angles of the pixels stored in the memory 4 are determined in the $C_b/C_r$ color plane and also stored in the memory 4.

Subsequently the control unit 2 and a digital signal processor 5 determine the rate at which the chroma angles occur and the location of possibly occurring accumulations in the $C_b/C_r$ color plane.

Subsequently the angles $\omega_o$ and $\omega_u$ are fixed by means of the digital signal processor 5, at which angles the straight lines through the origin of the $C_b/C_r$ color plane constituting the transition boundaries are arranged relative to the vector $D_{KC}$ of the key color in the $C_b/C_r$ color plane.

The angles $\omega_o$ and $\omega_u$ are chosen to be such that the accumulations which are closest to the key color KC and which are not located in the angular range $-\omega_{KC}/+\omega_{KC}$ around the vector $D_{KC}$ of the key color KC, are arranged in the $C_b/C_r$ color space in such a way that they are no longer situated in the region between the key color KC and the transition boundaries.

As a result, the pixels with these color locations are not influenced and completely belong to the foreground picture signal when the foreground picture signal is separated in accordance with the equations defined hereinbefore.

The arrangement shown in FIG. 3 shows how optimum angles $\omega_o$ and $\omega_u$ can be found for the straight lines through the origin of the $C_b/C_r$ color plane representing the transition boundaries.

Based on the equations defined hereinbefore, the foreground picture signal FG can then be separated from the mixed picture signal MG. This may alternatively be effected, for example by means of a digital signal processor which is not shown in the Figure.

I claim:

1. A method of separating a foreground picture signal FG from a mixed picture signal MG which has a key color KC as well as transition colors to the key color in key regions, the foreground picture signal being removed from the key color and the transition colors in accordance with the equation $$FG = MG - k^*KC$$

in which k is a control signal which has a value of about 1 in the region of the key color KC and a value of about 0 at transition boundaries, the transition boundaries in a $C_b/C_r$ color plane being constituted by two straight lines through the origin of the $C_b/C_r$ color plane which, relative to a vector $D_{KC}$ of the key color extending from the origin of the $C_b/C_r$ color plane to the color location of the key color KC, are arranged at angles $\omega_o$ and $\omega_u$, respectively, characterized in that said method comprises the steps:

filtering, from the mixed picture signal, pixels having color locations in the $C_b/C_r$ color plane which are spaced apart by a distance which is smaller than a predetermined distance from color locations of one or more pixels adjoining one another with respect to time or location and having color locations in the $C_b/C_r$ color plane which are arranged outside a predetermined angular range around the vector $D_{KC}$;

determining accumulations of the filtered pixels; and choosing the angles $\omega_o$ and $\omega_u$ of the two straight lines through the origin of the $C_b/C_r$ color plane such that the accumulations closest to the key color KC in the $C_b/C_r$ color plane are not located in the region between the key color KC and the transition boundaries constituted by the straight lines through the origin of the $C_b/C_r$ color plane.

2. A method as claimed in claim 1, characterized in that the control signal k is also used to control a fading between the foreground picture signal and a background picture signal.

3. A method as claimed in claim 1, characterized in that in the step of filtering the pixels from the mixed picture signals, values of distances between the color locations and one or more pixels adjoining one another with respect to time or location are determined and evaluated field by field.

4. An arrangement for separating a foreground picture signal FG from a mixed picture signal MG which has a key color KC as well as transition colors to the key color in key regions, the foreground picture signal being removed from the key color and the transition colors in accordance with the equation $$FG = MG - k^*KC$$

in which k is a control signal which has a value of about 1 in the region of the key color KC and a value of about 0 at transition boundaries, the transition boundaries in a $C_b/C_r$ color plane being constituted by two straight lines through the origin of the $C_b/C_r$ color plane which, relative to a vector $D_{KC}$ of the key color extending from the origin of the $C_b/C_r$ color plane to the color location of the key color KC, are arranged at angles $\omega_o$ and $\omega_u$, respectively, characterized in that said arrangement comprises:

- a coordinate transformation stage to which said mixed picture signal is applied, said coordinate transformation stage performing a coordinate transformation on the mixed picture signal in response to a control signal on a control input;
- a comparison circuit having a first input coupled to an output of said coordinate transformation stage;
- a memory having an input coupled to an output of said comparison circuit;
- a digital signal processor having an input coupled to an output of said memory; and
- a control unit coupled to the control input of said coordinate transformation stage, a second input of said comparison circuit, said memory and said digital signal processor, said control unit determining color location distances and applying said color location distances to said comparison circuit for comparing with distances between pixels adjoining one another with respect to time or location,
- storing in said memory the pixels at the output of said comparison circuit whose color locations are spaced apart by a distance which is smaller than a predetermined distance from color locations of one or more pixels adjoining one another with respect to time or location,
- determining chroma angles in the $C_b/C_r$ color plane of the pixels stored in the memory and also storing the chroma angles in said memory, determining accumulations from the stored chroma angles by means of said digital signal processor and, selecting accumulations from the determined accumulations which are closest to the key color KC but are outside a predetermined angular range $-\omega_{KC}/+\omega_{KC}$ in the $C_b/C_r$ color plane, and
- selecting the angles $\omega_o$ and $\omega_u$ of the straight lines through the origin of the $C_b/C_r$ color plane closest to the key color KC are no longer located in the region between the transition boundaries and the key color KC, said angles being applied to an output of said digital signal processor.

5. A method as claimed in claim 2, characterized in that in the step of filtering the pixels from the mixed picture signal, values of distances between the color locations and one or more pixels adjoining one another with respect to time or location are determined and evaluated field by field.

* * * * *